United States Patent [19]

Norvell

[11] Patent Number: 5,052,012

[45] Date of Patent: Sep. 24, 1991

[54] LASER CATHODE

[75] Inventor: Gordon S. Norvell, Huntington Beach, Calif.

[73] Assignee: Rockwell International Corporation, El Segundo, Calif.

[21] Appl. No.: 580,031

[22] Filed: Sep. 10, 1990

[51] Int. Cl.⁵ .............................................. H01S 3/097
[52] U.S. Cl. ........................................ 372/87; 372/94; 372/92
[58] Field of Search .............................. 372/94, 92, 87

[56] References Cited

U.S. PATENT DOCUMENTS

| | | | |
|---|---|---|---|
| 4,007,431 | 2/1977 | Abbink et al. | 372/94 |
| 4,392,229 | 7/1983 | Hostetler | 372/94 |
| 4,575,855 | 3/1986 | Council | 372/94 |
| 4,612,647 | 9/1986 | Norvell | 372/94 |
| 4,853,940 | 8/1989 | Ford et al. | 372/87 |
| 4,926,437 | 5/1990 | Ford | 372/94 |

Primary Examiner—Léon Scott, Jr.
Attorney, Agent, or Firm—H. Fredrick Hamann; George A. Montanye; Tom Streeter

[57] ABSTRACT

A laser cathode is formed by placing a conductive hemisphere on the side of the lasing cavity. Material is sputtered from the hemisphere to form a conductive layer on the cavity side and on the seal which bonds the hemisphere to the side. A protective oxide layer is formed on the sputtered layer and the hemisphere by filling the cathode with oxygen and passing a current through it.

18 Claims, 3 Drawing Sheets

TABLE OF CATHODE OPERATING CONDITIONS

| Cathode Type | Cathode Diameter (cm) | Cathode Surface Area (sq. cm) | Cathode Height (cm) | Current (ma) | Current Density (ma/sq cm) | Typical Life hours | Remarks |
|---|---|---|---|---|---|---|---|
| A | 2.29 | 14.6 | 2.54 | 4.00 | 0.274 | 56,000 | |
| B | 2.03 | 11.6 | 2.29 | 3.20 | 0.276 | 750 | |
| B | 2.03 | 11.6 | 2.29 | 2.50 | 0.216 | 21,600 | |
| C | 2.03 | 4.3 | 1.70 | 1.25 | 0.291 | 1,600 | |
| | | | 1.70 | 1.50 | 0.350 | 1,600 | |
| | | | 1.70 | 1.70 | 0.400 | 8,200 | |
| | | | | | Total | 11,400 | |
| B | 2.03 | >11.6* | 2.29 | 3.20 | <0.276* | 2,160** | 3 cathodes under life test |

*Cathodes were presputtered; therefore, effective surface area was increased and current density decreased.

**Cathodes still operating.

FIG. 5

LASER CATHODE

BACKGROUND OF THE INVENTION

The present invention relates to cathodes for lasers, and has particular relation to such cathodes with extended life.

A typical cathode for a laser, especially a laser in a ring laser gyro (RLG), is a dome of aluminum sealed to a glass-ceramic body. It is desirable for the RLG, and thus for the cathode, to be as small as possible, since many military and commerical applications require instruments to fit into a predescribed volume. At the same time, small cathodes imply high current densities, which imply reduced life spans. One important mechanism in cathode failure is sputter entrapment of the lasing gas. As ions from the lasing gas strike the cathode, aluminum ions are sputtered from the cathode and are reattracted to the cathode, and/or to the surface under the cathode. As they fall back upon the cathode or upon the surface under the cathode, they entrap molecules of the lasing gas, thereby removing such lasing gas molecules from operation. Eventually there is insufficient lasing gas for lasing to continue, and the apparatus fails.

One means of extending cathode life has been to oxidize the inner surface of the cathode with a thin layer of aluminum oxide. The aluminum oxide is more resistant to being sputtered than is the underlying aluminum itself. Even with this improvement, however, current density must be kept below some maximum, or the ions from the lasing gas (typically neon) will strike with sufficient force to sputter the aluminum oxide layer and eventually to sputter the underlying aluminum also, with the aforementioned deleterious results.

SUMMARY OF THE INVENTION

It is an objective of the present invention to provide smaller laser cathodes, yet to maintain current density at a sufficiently low level as to permit extended life.

It is a feature of the present invention that the aforesaid layer of aluminum oxide may be continued over the entire invention.

It is an advantage of the present invention that it may be implemented with sputtering apparatus which generally is present in the construction of a ring laser gyro anyway.

BRIEF DESCRIPTION OF THE DRAWINGS

These and other objectives, features, and advantages are shown with reference to the following drawings in which:

FIG. 5 is a table of cathode operating conditions.

DETAILED DESCRIPTION OF A PREFERRED EMBDOIMENT

Figure 1:
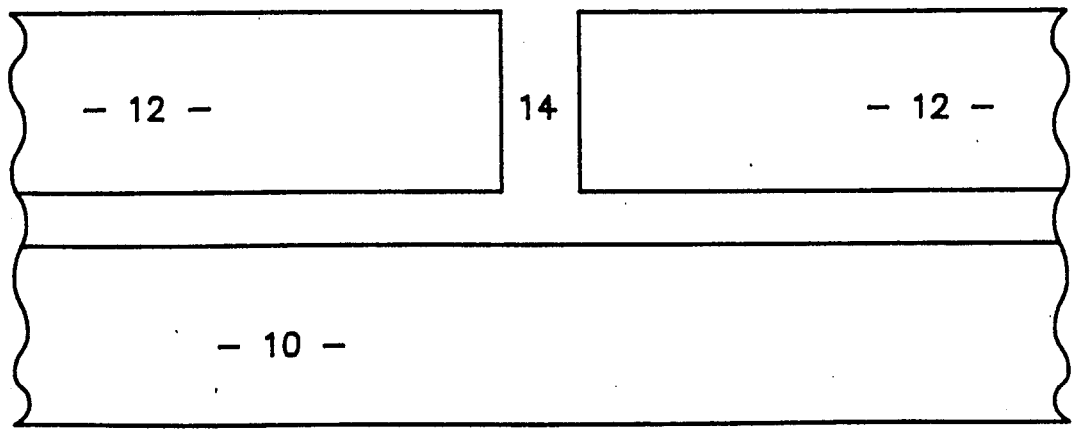
FIG. 1 is a cross-sectional representation of a lasing tube with a hole in it.

In FIG. 1, a lasing cavity 10, 12 has a hole 14 cut in it. Side 10 represents the portion of the lasing cavity opposite the hole 14; side 12 represents the portion of the lasing cavity adjacent to the hole 14.

Figure 2:
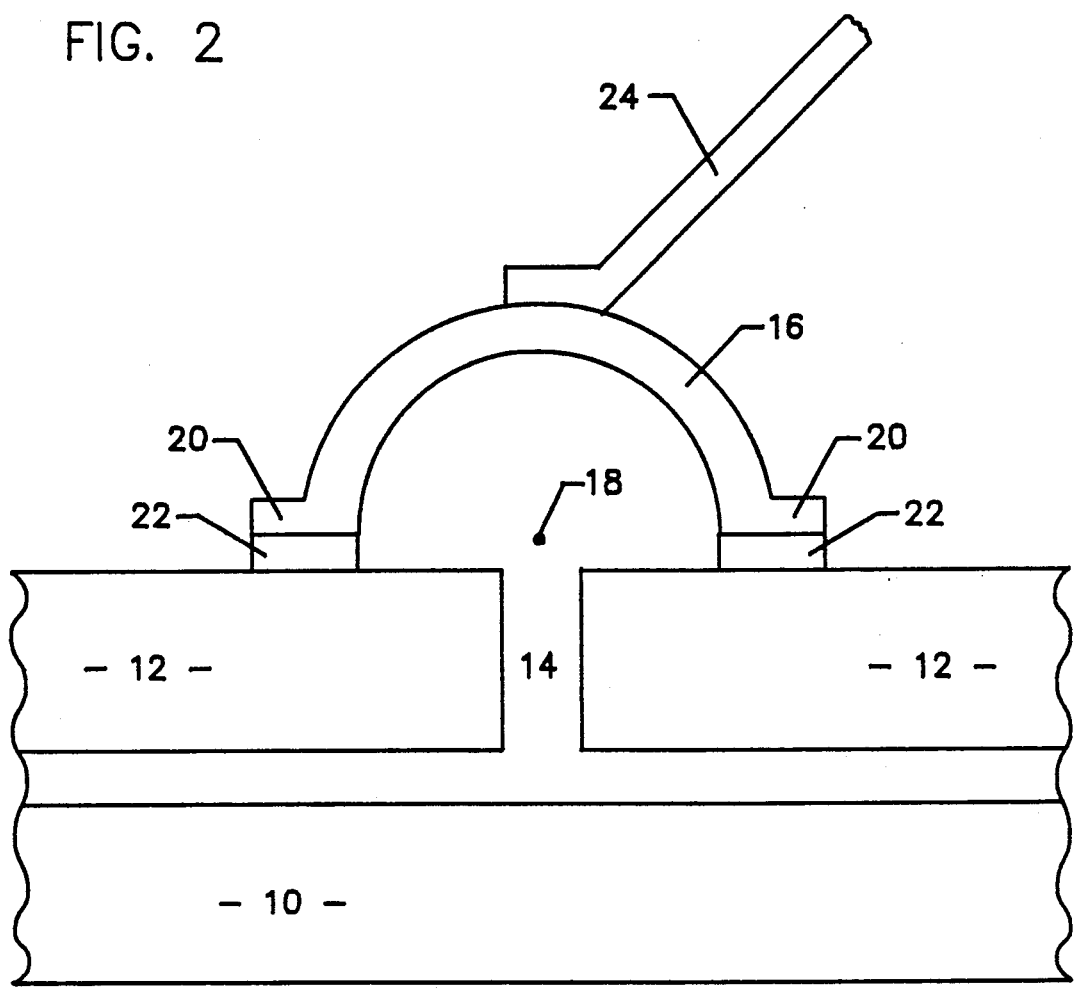
FIG. 2 is a cross-sectional representation of a laser cathode covering the hole described in FIG. 1.

In FIG. 2, an aluminum hemisphere 16 with a center 18 is placed over the hole 14. The hemisphere 16 has an annular foot 20 which rests on the lasing cavity side 12. The foot 20 is generally bonded to the surface of side 12 by an annulus 22 of indium. The hemisphere center 18 is placed at the top of the hole 14, so that neon ions passing through the hole 14 will have an equal distance to travel in any direction to the hemisphere 16, and thereby will produce an even currently density. A wire 24 is bonded to the outer surface of the hemisphere 16. Electricity flows through the wire 24 to the hemisphere 16 and thence into the laser cavity to a suitable anode (not shown). The hemisphere 16 therefore acts as a cathode.

Figure 3:
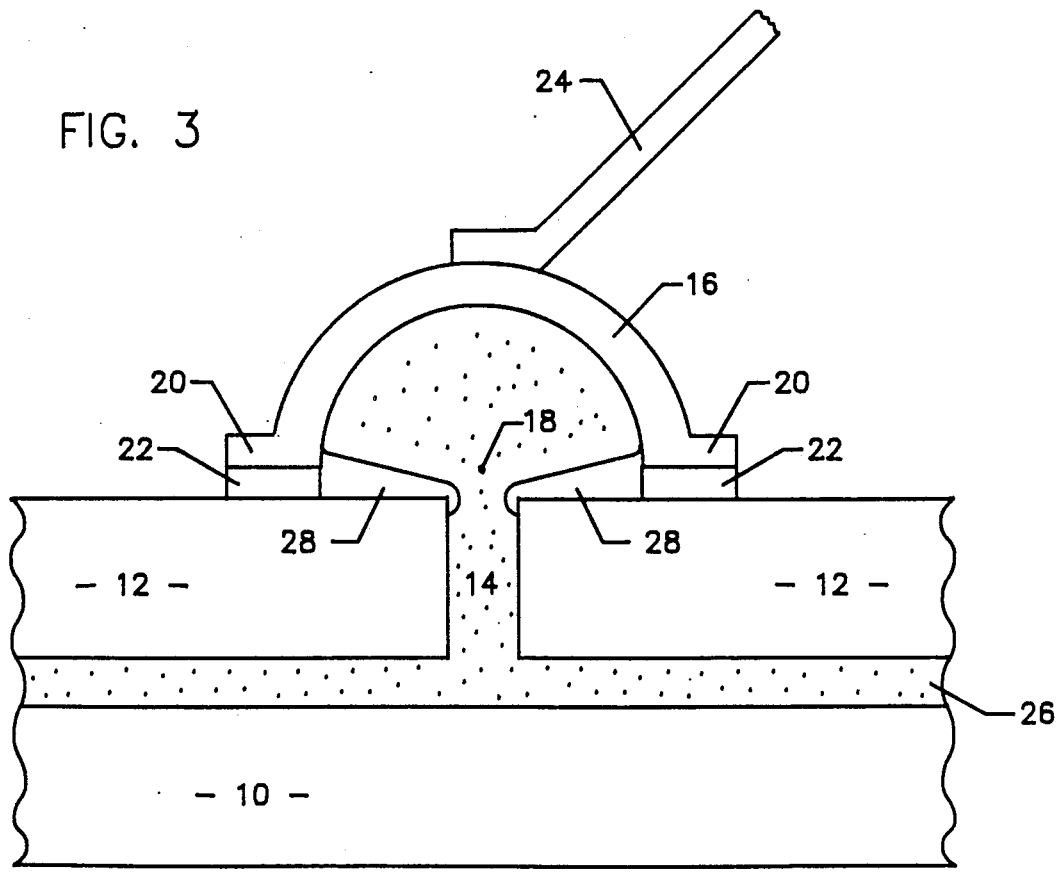
FIG. 3 is a cross-sectional representation of an intermediate step in the construction of the apparatus of the present invention.

In FIG. 3, a gas 26 is introduced into the cavity and, therefore, into the interior of the cathode 16. The gas is preferably neon. An electric current is then passed through the cathode 16 and gas 26 causing the aforementioned sputtering. A layer of aluminum 28 forms on the outer surface of side 12 under the cathode, and includes some of the neon 26. It is possible to include helium with the neon in the gas 26, but no useful purpose is served, since the helium is too light to sputter the aluminum from the hemisphere 16 to the layer 28. Other sputtering gases, such as argon, should be omitted from the gas 26, since whatever sputtering gas is used will be embedded in the layer 28 along with the aluminum. When the laser is placed in service, inevitably some of the layer 28 will be resputtered back into the gas 26, and argon contamination from the layer 28 will contaminate the lasing gas 26. It is therefore preferred that whatever lasing gas will be used when the cathode is in service also be used to sputter the aluminum from the hemisphere 16 to the layer 28. Further, since resputtering of the layer 28 entraps molecules from the gas 26 into the layer 28, the additional neon in the layer 28 can be viewed as a reservoir to offset the depletion of neon from the lasing gas 26 when the laser is placed in service.

Figure 4:
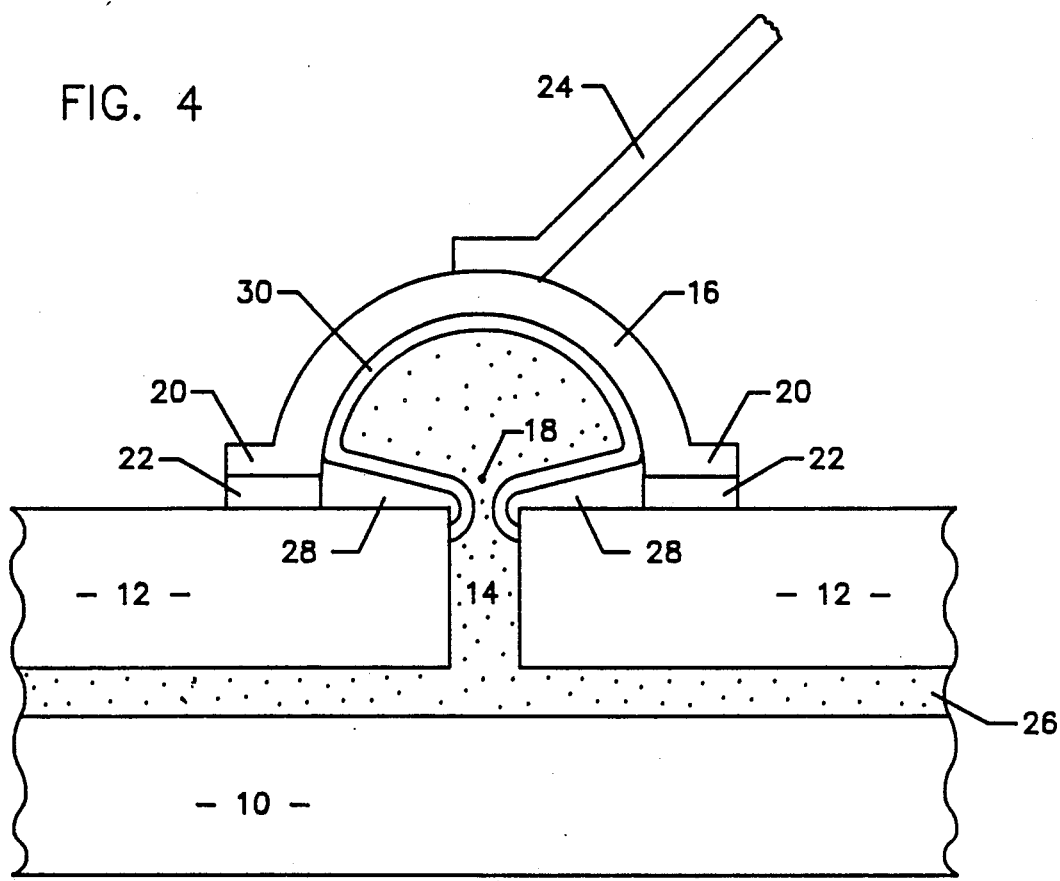
FIG. 4 is a cross-sectional representation of the present invention, when complete.

In FIG. 4, the sputtering/lasing gas 26 is replaced with oxygen, and the oxygen is allowed to oxidize the hemisphere 16 and sputtered layer 28, thereby forming a continuous layer of aluminum oxide 30. A current of 1 to 2 milliampere for a period of 10 to 30 minutes is generally sufficient, with an oxygen pressure of approximately 3 Torr. Some of the inner surface of the hemisphere 16 and of the layer 28 of aluminum is sacrificed to form the aluminum oxide. The aluminum oxide layer 30 should be approximately 100Å thick, although thicker of thinner layers will also serve.

Since some of the aluminum of the sputtered layer 28 must be sacrificed to form aluminum oxide, the sputtered layer 28 should be between 500Å and 1000Å thick. Again, thicker or thinner layers will serve, but the layer must not become excessively thin or thick. If the layer 28 becomes excessively thin, then too much of it will be consumed by the aluminum oxide formation, and too much resistance will be placed to current flowing through it. If the layer 28 is excessively thick, then manufacturing time is increased, and too much current will flow through the layer 28. This can become a problem since, near the hemisphere center 18, electricity has a shorter distance to flow through the gas 26 than if it were required to go all the way to the hemisphere 16. Current densities near the center 18 therefore tend to increase. This excess density can be somewhat offset by making the layer 28 thin enough as to provide significant resistance to the current.

The layer 30 should be made sufficiently thick as to provide a reasonably smooth surface, of holidays in the layer 30 will be formed. The layer 28 need not be thicker than that of the indium seal 22, because the aluminum will sputter onto the interior surface of the indium seal 22, as well as onto the cavity side 12, thus providing a continuous layer. This has the added benefit of isolating and sealing off the indium seal 22 from the lasing gas 26 during operation.

Once the oxide layer 30 has been formed, the oxygen 26 may be removed, and a lasing gas, typically a helium-neon mix of approximately 6 Torr may be inserted into the cavity and again, a current of 1 to 2 milliamperes applied. This allows a long term operability of the laser.

Applicant has performed experiments on various cathodes, the results of which are shown in FIG. 5.

While aluminum is the preferred material for the hemisphere 16 and sputtered layer 28, any conductive material will function. The protective oxide layer 30, while desirable, is not essential, and may be replaced with a non-oxide layer, or may even be entirely omitted, if convenient. The wire 24 may be bonded to the hemisphere 16 either before or after the hemisphere 16 is bonded to the layer 28. The hemisphere 16 conveniently acts as a cathode when the use ofa helium-neon lasing gas is contemplated, but may also serve as an anode when convenient. "Cathode," as used in the present invention, accordingly includes "anode" whenever small volume and low current density must be joined in an anode.

INDUSTRIAL APPLICABILITY

The present invention is capable of exploitation in industry, and can be used, whenever it is desired to produce a cathode to an at least partially electrically conductive gas, the cathode having comparatively small volume and comparatively long life. The present invention is capable of being made by the above-described processes which are, each considered in isolation, entirely conventional; or it can be made by any suitable nonconventional analog of these conventional processes.

While a particular embodiment of the present invention has been shown, the true scope and spirit of the present invention are not limited to this particular embodiment, but are limited only by the appended claims.

What is claimed is:

1. A method for making a laser cathode, comprising:
    placing a concave conductor over an exterior surface of a side of a lasing cavity, the side defining the exterior surface and a hole from the exterior surface to the lasing cavity, the exterior surface being other than a surface of the conductor itself, and the concave portion of the conductor facing the exterior surface; and
    sputtering a layer of conductive material from the conductor onto a portion of the exterior surface facing the concave portion of the conductor, the material layer being in electrical contact with the conductor.

2. The method of claim 1 wherein the conductor comprises a hemisphere.

3. The method of claim 1, further comprising the step of forming a protective layer on the material layer and on the conductor.

4. The method of claim 3 wherein the step of forming the protective layer comprises the steps of passing an electric current through the cathode in the presence of a reactive gas.

5. The method of claim 4 wherein the reactive gas comprises oxygen.

6. The method of claim 1 wherein the conductor is affixed to the surface with a seal.

7. The method of claim 6 wherein the seal and the conductor comprise different materials.

8. The method of claim 6 wherein the step of sputtering material from the conductor further comprises the step of sputtering material onto a surface of the seal.

9. The method of claim 8 wherein the sputtered material seals the surface of the seal.

10. Apparatus for making a laser cathode, comprising:
    means for placing a concave conductor over an exterior surface of a side of a lasing cavity, the side defining the exterior surface and a hole from the exterior surface to the lasing cavity, the exterior surface being other than a surface of the conductor itself, and the concave portion of the conductor facing exterior surface; and
    means for sputtering a layer of conductive material from the conductor onto a portion of the exterior surface facing the concave portion of the conductor, the material layer being in electrical contact with the conductor.

11. The apparatus of claim 10 wherein the conductor comprises a hemisphere.

12. The apparatus of claim 10, further comprising means for forming a protective layer on the material layer and on the conductor.

13. The apparatus of claim 12 wherein the means for forming the protective layer comprises means for passing an electric current through the cathode in the presence of a reactive gas.

14. The apparatus of claim 13 wherein the reactive gas comprises oxygen.

15. The apparatus of claim 10 wherein the conductor is affixed to the surface with a seal.

16. The apparatus of claim 15 wherein the seal and the conductor comprise different materials.

17. The apparatus of claim 15 wherein the means for sputtering material from the conductor further comprises means for sputtering material onto a surface of the seal.

18. The apparatus of claim 17 wherein the sputtered material seals the surface of the seal.

* * * * *